March 12, 1957     F. S. BASTER     2,784,705
WATER SOFTENER
Filed May 12, 1955
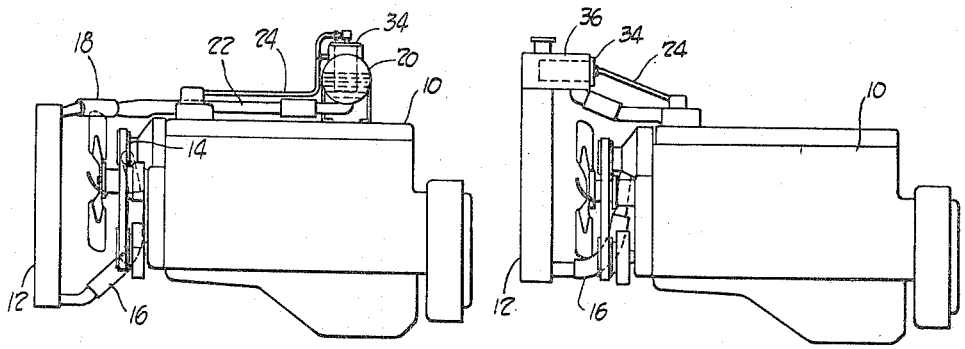
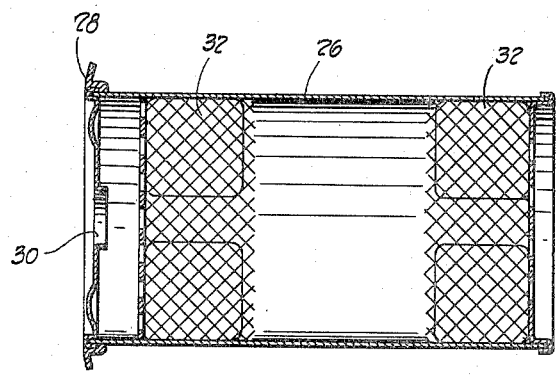
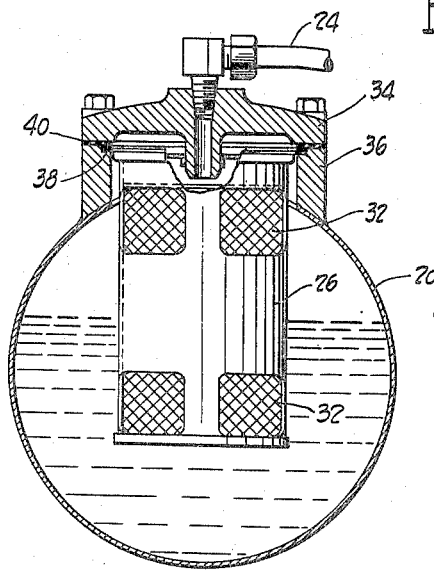
INVENTOR.
FOREST S. BASTER
BY
RICHEY, WATTS, EDGERTON & McNENNY
ATTORNEYS

United States Patent Office 2,784,705
Patented Mar. 12, 1957

2,784,705
WATER SOFTENER

Forest S. Baster, Cleveland, Ohio, assignor to The White Motor Company, Cleveland, Ohio, a corporation of Ohio Application May 12, 1955, Serial No. 507,832

6 Claims. (Cl. 123—41.42)

This invention relates to water softening equipment and more particularly to water softening apparatus in the cooling system of an internal combustion engine which functions as the prime mover for a vehicle.

One of the objects of this invention is to provide a water softening device located in the cooling system of an internal combustion engine for eliminating hardness usually found in water added to the cooling system, thus prolonging the life of the engine.

The operation of a motor vehicle under adverse conditions requires large power outputs from the engine. As a result the coolant temperature rises to a point where part of the coolant may be lost by evaporation or overflow. In order to return the cooling system to a safe operating condition coolant water is added to the system to replace the water which has been lost. As the water is evaporated, the hardness which is in the water when it is added to the system is accumulated, since the water in effect is distilled by the heat in the engine. After repeated additions of water, large amounts of hardness are built up in the water which will thereupon attack the materials forming the engine structure. If this condition continues and especially at elevated temperatures, the walls of the cooling passages in the engine may be corroded away with the result that leakage occurs into portions of the engines which should not be subjected to moisture conditions. If such leakage occurs in the high pressure region in the engine, the products of combustion may pass into the cooling system of the engine which makes it impossible to retain a coolant therein.

To prevent corrosive action of concentrated hardness in the water in the cooling system, the applicant has provided a water softening element in the circulation path of the water which is effective to remove the damaging materials from the water. The water softening element may take the form of a zeolite cartridge which is submerged in the coolant where it may be easily contacted by the water. As the water passes through the cartridge, it contacts the zeolite material with the result that an ion-exchange occurs which removes the hardness elements from the water and retains them in the cartridge. The cartridge continues to soften the water until all of the original material has been changed by a reaction with the hardness elements. When this condition obtains, the cartridge may be removed and replaced with a new cartridge which continues to maintain the water soft in the cooling system. The cartridge is relatively inexpensive and an easily removable cover plate is provided for access through the cooling system as required for exchanging the cartridge.

Accordingly it is one of the objects of the invention to provide a cartridge type softener unit located in a tank which contains a portion of the coolant and is connected to the cooling system of the internal combustion engine.

Another important object of the invention is to provide a water softening cartridge removably mounted in the pressure tank of a cooling system for a vehicle engine.

A still further object of this invention is to provide a water softening element in the top tank of a radiator which is disposed in the cooling system of an internal combustion engine.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 1 is a side elevation view showing a typical engine and cooling system of the surge tank type having a water softening unit included therein.

Fig. 2 is a side elevation view of a typical engine and radiator assembly having a water softener unit in the top tank of the radiator.

Fig. 3 is a detail view of a cartridge containing water softening material of the ion-exchange type; and Fig. 4 is an enlarged sectional view of the surge tank.

Referring first to Fig. 1 of the drawings, an engine 10 is shown therein of the internal combustion type used generally for propelling vehicles. The engine 10 is provided with a cooling radiator 12 connected to a water pump 14 by an inlet hose 16. Inlet 16 connects to the bottom of radiator 12 and conducts the cooled water to the pump 14 where it is discharged into the cooling passages of the engine 10.

A surge tank 20 located above the engine 10 and the radiator 12 is connected to the engine 10 by a conduit 22 which allows the flow of water from the surge tank 20 to the engine 10 as required to maintain the cooling system full at all times. A vent line 24 connects the top of the surge tank 20 to the engine 10 to relieve any accumulation of air in the engine 10, thus facilitating the filling of the engine. The water softening cartridge 26 is disposed in the surge tank 20 and has a substantial portion submerged in the cooling water.

The cartridge 26 is shown in detail in Fig. 3 as having a flange 28 at one end thereof. Free circulation of the water through the cartridge 26 is provided through an opening 30 in the flanged end, and through a plurality of foraminous sections 32 formed in the side walls of the cartridge 26. The cartridge 26 is filled with an ion-exchange type of water softening material such as zeolite. The quantity of zeolite material contained in the cartridge is relatively inexpensive and is sufficient to soften a considerable quantity of water. The softening ability of the cartridge will remove the hardness in the initial filling of the system as well as the water added to the system during a long period of use.

The replacement or exchange of the cartridge 26 is facilitated by the provision of a flange type cover 34 which engages a mating flange 36 affixed to the coolant tank that may be the surge tank 20 as shown in Fig. 4. The inner diameter of the flange 36 and the opening on the surge tank 20 is sufficiently large to receive the body of the cartridge 26. A flange 28 of the cartridge 26 is received by a recess 38 formed in the upper surface of the flange 36. A gasket 40 lies between the flange 34 and the flanges 36 and 28 for preventing leakage of the vapor which forms in a pressurized system of this type.

The cover 34 is easily removable by this type of construction for replacement of the cartridge 26 as required by the addition of quantities of hard water. When the cover 34 is removed the cartridge 26 may be withdrawn and replaced by a fresh unit which will then continue the softening action until the zeolite has lost its effectiveness.

In Fig. 2 the softening cartridge is disposed in the top tank of a radiator of conventional type and the flanged cover 34 is disposed in the side wall of a top tank 36. The vent connection 24 is made to the cover plate 34 to enhance the circulation of the water through the softening cartridge 26. Upon each warm-up of the engine, some of the cooling water will be discharged through the vent line 24 through the cartridge 26, thus causing an increased quantity of the cooling water to contact the zeolite material.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim and desire to secure by Letters Patent is:

1. A cooling system for an internal combustion engine comprising a radiator, a pump, a reservoir on said radiator, conduit means interconnecting said engine, radiator, pump and reservoir to form a closed circulation system, and water softening means in said reservoir in contact with the coolant in said system whereby the coolant contacts said water softening means before flowing through said engine.

2. A cooling system for an internal combustion engine comprising a radiator, a pump, a reservoir on said radiator, conduit means interconnecting said engine, radiator, pump and reservoir to form a closed circulation system and a water softening cartridge in said reservoir in contact with the coolant in said system whereby the coolant contacts said water softening means before flowing through said engine.

3. A cooling system for an internal combustion engine comprising a radiator, a pump, a reservoir on said radiator, conduit means interconnecting said engine, radiator, pump and reservoir to form a closed circulation system, and a water softening cartridge containing ion-exchange material in said reservoir in contact with the coolant in said system whereby the coolant contacts said water softening means before flowing through said engine.

4. A cooling system for an internal combustion engine comprising a radiator, a pump, a surge tank, conduit means interconnecting said engine, radiator, pump and surge tank to form a closed circulation system, and water softening means in said surge tank in contact with the coolant for said system whereby the coolant contacts said water softening means before flowing through said engine.

5. A cooling system for an internal combustion engine comprising a radiator, a pump, a surge tank, conduit means interconnecting said engine, radiator, pump and surge tank to form a closed circulation system, and a water softening cartridge in said surge tank in contact with the coolant for said system whereby the coolant contacts said water softening means before flowing through said engine.

6. A cooling system for an internal combustion engine comprising a radiator, a pump, a surge tank, conduit means interconnecting said engine, radiator, pump and surge tank to form a closed circulation system, a water softening cartridge in said surge tank in contact with the coolant for said system whereby the coolant contacts said water softening means before flowing through said engine, and means for mounting said cartridge in said surge tank for quick release.

References Cited in the file of this patent

UNITED STATES PATENTS 2,115,193     Burris _____ Apr. 26, 1938

FOREIGN PATENTS 1,069,327     France _____ Feb. 10, 1954